United States Patent
Kirla

[11] Patent Number: 6,050,520
[45] Date of Patent: Apr. 18, 2000

[54] VERTICAL TAKE OFF AND LANDING AIRCRAFT

[76] Inventor: Stanley J. Kirla, 81 River Rd., Deep River, Conn. 06417

[21] Appl. No.: 09/157,730

[22] Filed: Sep. 21, 1998

[51] Int. Cl.[7] .................................................. B64C 15/00
[52] U.S. Cl. ................... 244/23 A; 244/23 C; 244/12.2; 244/10
[58] Field of Search ................ 244/23 A, 12.2, 244/12.3, 17.19, 23 C, 65, 67, 10, 19

[56] References Cited

U.S. PATENT DOCUMENTS

| | | | |
|---|---|---|---|
| 2,718,364 | 9/1955 | Crabtree | 244/12 |
| 2,835,073 | 5/1958 | Dame | 244/12.2 |
| 2,927,746 | 3/1960 | Mellen | 244/12 |
| 2,997,254 | 8/1961 | Mulgrave | 244/12 |
| 3,104,853 | 9/1963 | Klein | 244/12 |
| 3,170,529 | 2/1965 | Kelley et al. | 244/23 C |
| 5,102,066 | 4/1992 | Daniel | 244/23 C |
| 5,170,963 | 12/1992 | Beck, Jr. | 244/12.2 |
| 5,203,521 | 4/1993 | Day | 244/12.2 |

*Primary Examiner*—J. Woodrow Eldred
*Attorney, Agent, or Firm*—C. G. Nessler

[57] ABSTRACT

An aircraft for vertical take off and landing is comprised of a rotor assembly mounted on a rotating drive shaft extending from the top of a cabin. The rotor assembly is comprised of a truncated-cone top, a spaced apart circular bottom, and internal vanes running radially, between the top and bottom, forming an air impeller. In operation, air is drawn through the central air intake of the top and discharged through an annular nozzle around the circumference of the rotor assembly. As the top rotates, additional air is rammed through scoops mounted at an angle to radii of the top, on the surface of the top. The torque applied to the cabin, due to rotation by the engine of the rotor assembly, is countered by the reaction force generated by a plurality of tabs extending from the cabin sidewall into the airstream flowing downwardly from the nozzle.

11 Claims, 4 Drawing Sheets

VERTICAL TAKE OFF AND LANDING AIRCRAFT

TECHNICAL FIELD

The present invention relates to flying machines, in particular to powered aircraft which are able to hover and take off and land more or less vertically.

BACKGROUND

Conventional helicopters of the type pioneered by Igor Sikorsky are well known for their ability to take off and land more or less vertically, and to hover in a stationary spot. Helicopter type aircraft are proven, and of great utility through their ability to take off and land vertically. They have enabled saving of many lives and accomplished otherwise impossible tasks. However, the blades in an ordinary helicopter are vulnerable to foreign object damage when the machine comes too close to stationary objects, such as trees and the like. And the rotor and blade systems in the now-familiar types of helicopters tend to involve numerous moving parts, making them complex to fabricate and maintain. Thus, there have long been efforts to develop other types of vertical take off and landing aircraft.

One of the avenues that has been pursued has been to make circular or toroidal shaped aircraft with internal air moving systems. For instance, U.S. Pat. No. 2,927,746 to Mellen describes a disc shape aircraft with a central impeller that causes air to flow radially across the top of the aircraft and downwardly from the periphery. U.S. Pat. No. 2,718,364 of Crabtree describes another circular aircraft, where there is an internal propeller which forces air downwardly through an opening in the center of the machine. U.S. Pat. No. 2,997,254 to Mulgrave describes a disc shaped aircraft where an internal radial fan discharges air dowwardly from a nozzle around the periphery of the craft. Beck, Jr. in U.S. Pat. No. 5,170,963 describes a vertical take off and landing aircraft having a ducted fan which discharges air radially outward over airfoils placed around the periphery of the disc shaped craft. Flow over the airfoils also induces downward air flow, across the top surface of the craft, adding lift. U.S. Pat. No. 3,104,853 to Klein describes an embodiment of a vertical take off and landing machine, wherein a downwardly curved, open centrifugal impeller flows air downwardly. Vanes around the periphery of the craft counter the tendency of the cabin part of the aircraft to rotate in reaction to the impeller. The present invention represents a continuation of the evolution of concepts and ideas of the prior inventors.

SUMMARY

An object of the invention is to provide a powered aircraft capable of more or less vertically taking off and landing, and hovering. A further object of the invention is to provide a vertical take off and landing type of aircraft with lifting means which are less vulnerable to damage than are the blades and rotor systems of conventional types of helicopters.

In accordance with the invention, an aircraft is comprised of a cabin and a rotor assembly mounted on a rotatable shaft extending vertically up from the cabin. The shaft is rotated by a prime mover, such as a gas turbine engine, in the cabin. The rotor assembly is comprised of a truncated-cone shape top having a central air intake opening, a circular bottom spaced apart from the top, and vanes running vertically between the top and the bottom; the combination forming a closed impeller. A downward-facing annular nozzle is formed between the circular outer edges of the top and bottom. During operation, the rotor assembly spins, drawing air through the central opening and blowing it downwardly through the nozzle. Since the spinning of the rotor assembly imparts a torque to the cabin, means for countering the torque are provided on the cabin. Preferably, the means comprise a plurality of variable orientation tabs affixed to the exterior of the cabin. Air blowing from the nozzle impinges on the tabs, to thereby impart to the cabin a reaction force which counters the torque.

In a preferred embodiment, the aircraft has a plurality of scoops on the upper surface of the top, spaced around the top near its outer circumference. Each scoop has an opening facing toward the direction in which the rotor assembly is adapted to rotate. Rotation of the rotor assembly causes air to be rammed into the scoop opening, and the air is then exhausted through the nozzle, significantly enhancing the lift that the top assembly generates. The scoops are either fixedly oriented so their openings lie at an angle to a radius of the top, or their orientation is adjustable. In another aspect of the invention, a plurality of struts extends from the bottom of the craft, to facilitate the landing of the craft on a surface. There are pivotable airfoils attached to the struts, to assist in controlling the orientation of the craft during flying.

The smooth exterior design of the craft and absence of exposed blades enables an improved aircraft of the present invention to fly faster than more conventional helicopters. Compared to conventional helicopters, there will be a reduction in the high maintenance costs which are commonly associated with the blades and blade control mechanisms; the new craft will be relatively quite, will have less vibration, fewer components, and good stability due to gyroscopic effects of the rotor assembly. The circular or saucer like shape also engenders improved fuselage strength.

The foregoing and other objects, features and advantages of the invention will become more apparent from the following description of preferred embodiments and accompanying drawings.

DESCRIPTION

Figure 1:
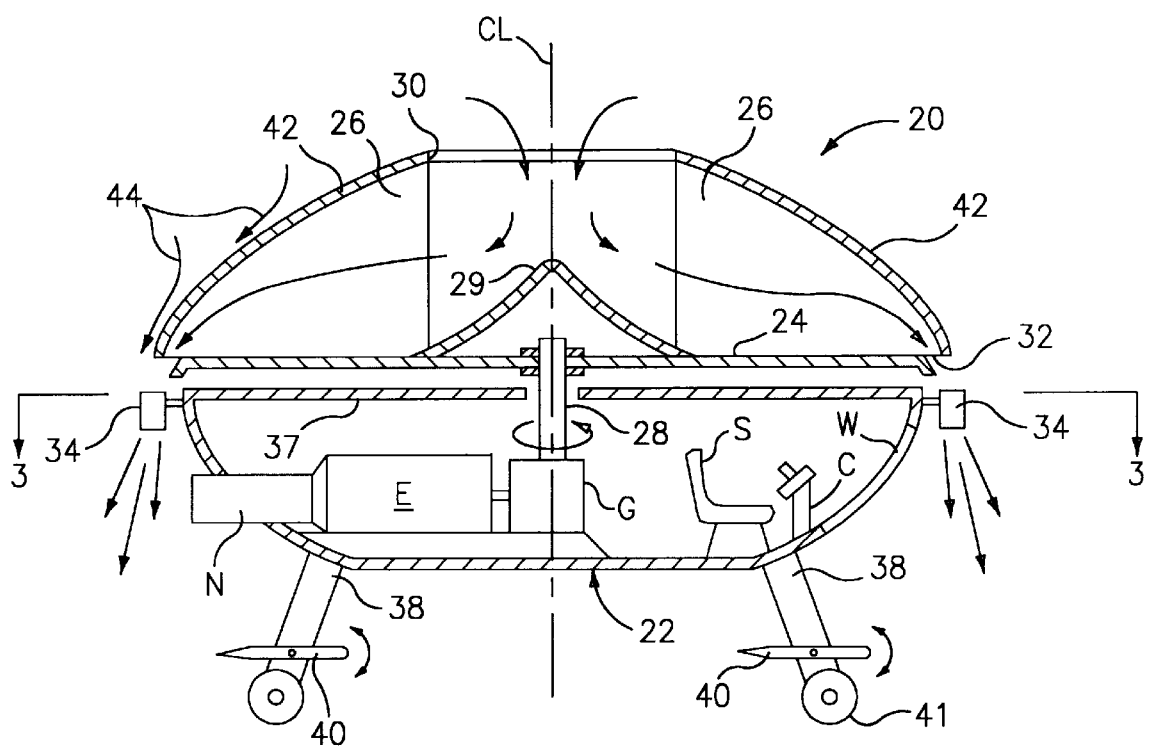
FIG. 1 is a vertical partial cross section of an aircraft.

The invention is described conceptually and various elements are shown schematically. Thus, it will be understood that the proportions between the various elements may vary in actuality from what is shown in the drawings. In will be also understood that various bearings, supporting structure, controls, and like things are not detailed, as they are within the ordinary skill of artisans concerned with aircraft and associated machinery.

Figure 2:
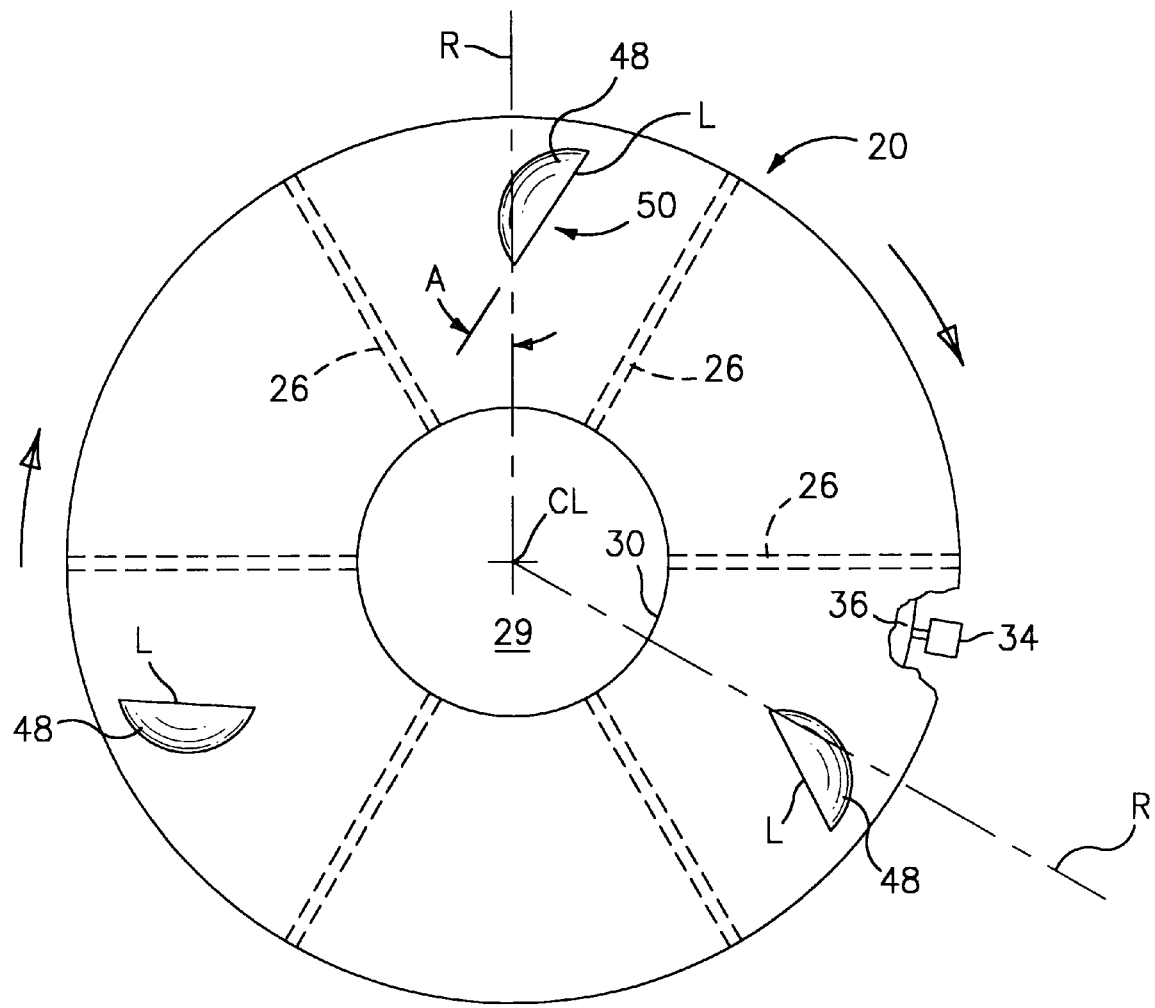
FIG. 2 is a top view of the aircraft of FIG. 1, showing the rotor assembly.
Figure 3:
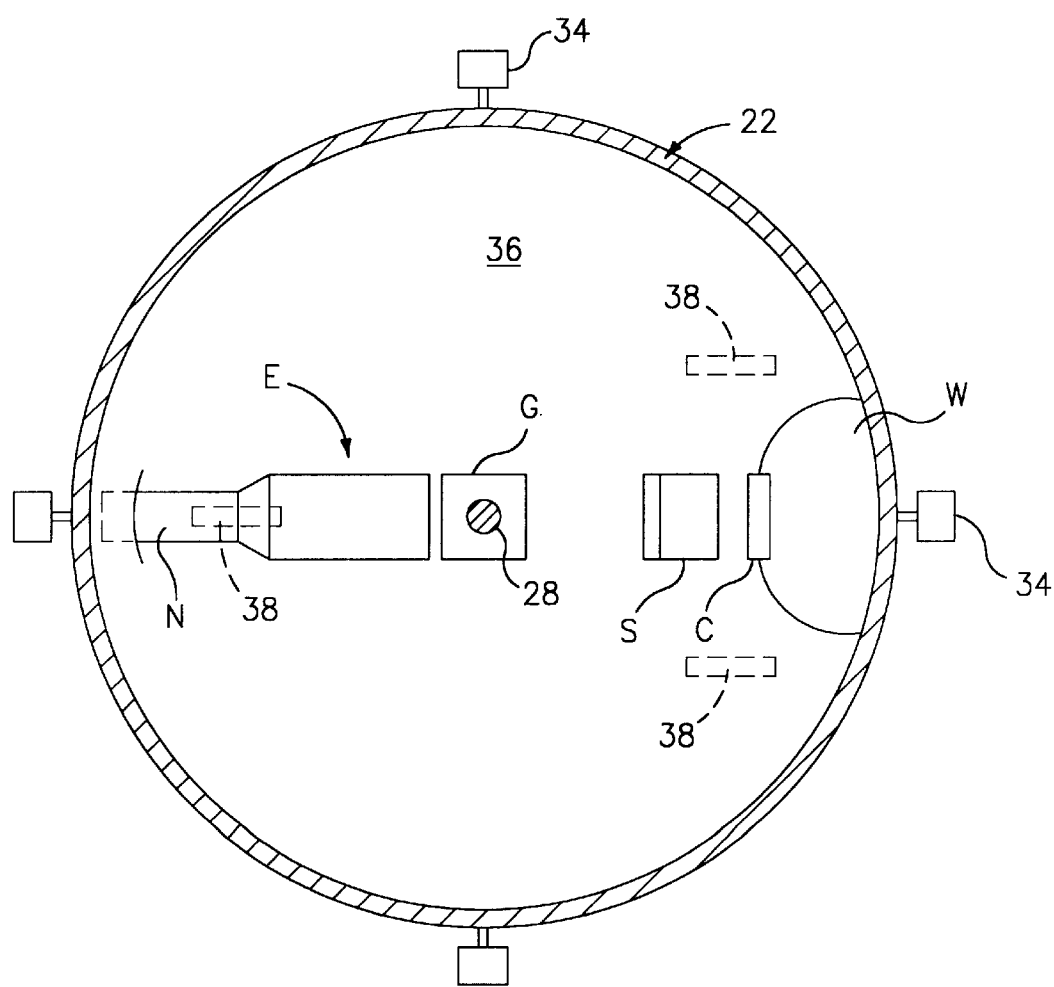
FIG. 3 is a top cross sectional view of the cabin (or lower) part of the aircraft of FIG. 1.

The aircraft is comprised of a cabin 22, above which is mounted the rotor assembly 20. FIG. 1 shows a partial vertical cross section and FIG. 2 shows a top view of the preferred embodiment of the aircraft invention. FIG. 3 shows a top cross-sectional view of the cabin. The rotor assembly is mounted at the upper end of rotatable shaft 28 which extends vertically upwardly from the cabin. During operation, the rotor assembly spins (in the clockwise direction looking down on the top as indicated by the arrow in FIG. 2), to induce lift as will be described.

Rotor assembly 20 is comprised of a closed impeller for moving air which lifts the aircraft. Six radial vanes 26 run between the curved top 42 and the flat circular bottom 24 of the assembly. More or fewer, and curved rather than straight, vanes may be used. The top has the shape of a flattened truncated curved cone, with the open base facing downwardly. See FIG. 1. Around the periphery of the rotor assembly, the annular opening of nozzle 32 is formed between the outer circular edges of top 42 and bottom 24. At the center of top 42 of the rotor assembly is air inlet opening 30. The opening 30 has a diameter of about one-third of the outside diameter of the craft. Mounted at the center of bottom 24, beneath the opening 30, is curved cone shaped airflow fairing 29.

When the rotor assembly spins with shaft 28 about the centerline CL of the machine, air is drawn downwardly through opening 30, thrust radially outwardly by action of the vanes 26, and then discharged downwardly through the nozzle 32, as represented by arrows in FIG. 1. As illustrated by arrows 44 in FIG. 1, the downward discharge of air from nozzle 32 tends to induce flow of air outwardly and downwardly, across the exterior surface of the top, to thereby lower pressure at the top of the craft, and induce lift. Likewise, lower pressure above the top of the rotor assembly, which is caused by the drawing of air into the intake opening, abets lift.

Figure 4:
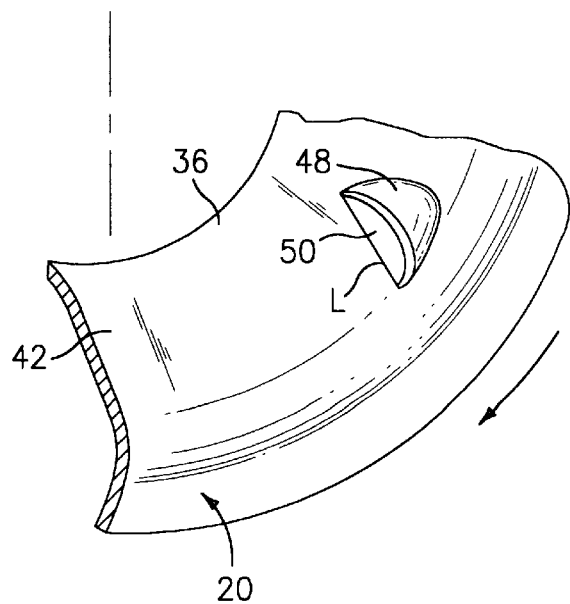
FIG. 4 shows a fixed air scoop which is on the top surface of the rotor assembly of the aircraft of FIG. 1.

As shown by FIG. 2, there are at least three air scoops 48, equally spaced apart around the periphery of the top 42. FIG. 4 shows a typical fixed air scoop 48. It is formed as a bulbous protrusion rising from the surface of the top 42, and has an opening 50 generally facing in the direction in which the top rotates during use. When looking down directly on the top, the opening 50 has a length L which lies at a preferred angle A of about 30 degrees to a radius R of the top, which radius lies in a plane perpendicular to the axis of spinning of the top, i.e., the length axis of the shaft 28, and which radius runs through the innermost point of the length of the scoop. See FIGS. 2 and 4. The innermost edge on of the scoop opening, that nearest the center of the top, is about two thirds of the way along the radius length. The length L of the opening 50, i.e., the nominal length of the front edge of the scoop, runs at the preferred 30 degree angle, to terminate near the periphery or outside circumference of the top. The front edge of the scoop may in other instances be somewhat curved. In such a case, the straight line which defines the mean path of the front edge of the scoop would be made to lie along angle A. Preferably, when looking directly at the scoop opening, along the surface of the top, the opening shape is approximates that of a chordal segment of a circle, as can be envisioned from FIG. 4. During rotation of the top, air is rammed into each scoop, to be then acted on by the outer ends of the vanes 26 and discharged from the circumferential nozzle opening 32.

Experiments show that during rotation of the rotor assembly the scoops thereby substantially augment the air flow through the central inlet opening, increasing the amount of air which is discharged through the nozzle at any given rotational speed. Experiments on the small-scale rotor assembly described below indicate that lift is increased by up to 75 percent when 3 scoops as described are used, compared to when the top has no scoops. Different numbers of scoops may be used, and they need not be confined to the preferred proportions and location. The height of the scoop opening may be varied, as may the shape. Scoops may be alternatively constructed in a manner such that they can be flattened or retracted into the surface of the top during flying operation, to the extent such may be desired during high speed lateral movement of the craft.

Figure 5:
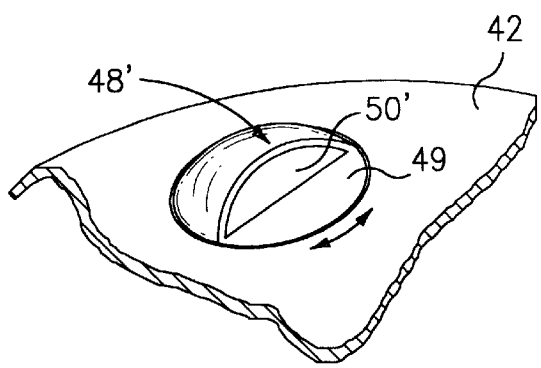
FIG. 5 shows an air scoop which has a variable orientation.

As illustrated by FIG. 5, another embodiment of scoop 48' is comprised of a circular base piece 49, rotatably captured on the surface of the top 42. With suitable servomechanism and controls, the orientation of the opening 50' of the scoop 48' may be varied from the preferred 30 degree angle A which characterizes a fixed scoop.

The cabin 22 is comprised of a housing 36 from which extend downwardly three legs 38. The legs have wheels 41 at their lower extremities, for supporting the craft on the surface of the earth when it is not flying. Alternately, skids may replace the wheels. As shown in FIG. 1, in cross section the aircraft exterior is defined by the exterior surfaces of the top and the cabin housing; and, the shape is generally the shape of a conventional lift-generating airfoil, where the front-to-back distance over the top is greater than the same distance along the bottom. Thus, in lateral motion, lifting due to the craft shape is present.

Contained within the cabin 22 and mounted on the floor of the housing 36 is prime mover E, such as a gas turbine engine. The exhaust from the gas turbine issues from nozzle N which projects through the sidewall of the cabin, to thus propel the craft laterally and assist in its vertical upward motion. The nozzle N is fitted with unshown flow vectoring and flow reversing means, known in the art on vertical take off and landing fixed wing aircraft, to control the direction in which the exhaust gases are directed. One or more ducted fans or propellers, driven by any type of prime mover, may be alternately used.

The rotary shaft output of the gas turbine is connected to reducing gear and transmission G, schematically illustrated, to drive rotary vertical shaft 28 and thereby spin the rotor assembly 20. The cabin housing is comprised of a roof 37. The operator is provided with a seat S and control pendant C. A window W in the side wall of the cabin housing 36 provides the operator with external visibility. Fuel tanks and engine controls will be understood to be within the cabin, and they are not shown.

Figure 6:
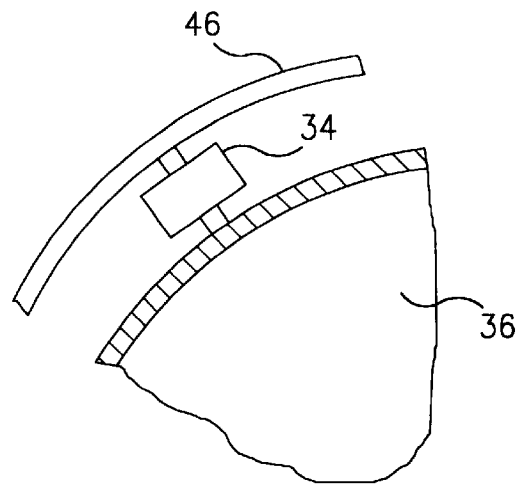
FIG. 6 shows a segment of the outside edge of the cabin housing of an aircraft, illustrating a protective ring for the flow-directing tabs at the cabin periphery.
Figure 7:
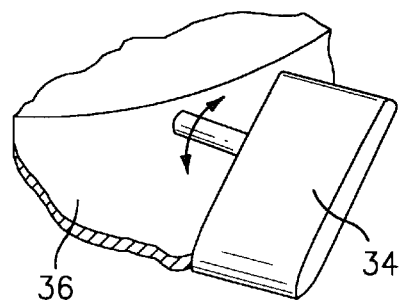
FIG. 7 shows in detail of a movable tab at the periphery of the cabin, for changing the direction of air flowing from the rotor assembly and for imparting counter-torque to the cabin.

Around the periphery of the upper edge of the circumferential sidewall of the cabin housing 36 are four or more adjustable tabs 34. See FIGS. 1, 2, 3 and 7. The tabs 34 are positioned so they lie just below the nozzle 32 of the rotor assembly. As illustrated by FIG. 7, the tabs are adjustably pivotable, so that some of the downwardly flowing air issuing from the nozzle 32 can be deflected at a desired angle to the vertical. The resultant reaction force on the each tab, due to the deflecting of the air stream, is imparted as a moment to the cabin. By appropriate selection of the number and size of tabs 34, and suitable adjustment of the angular orientation of the tabs, the torque imparted to the cabin by the prime mover when it drives the rotor assembly can be thus be countered by the reaction force on the tabs. Thus, the operator may cause the cabin window to face along a constant desired bearing, or to slowly rotate in a desired direction. FIG. 6 shows how a ring 46 may be optionally run around the periphery of the craft, outboard of the tabs 34, to protect them against possible damage should the craft contact a fixed object. As suggested, fewer or more than four tabs may be used. In certain craft, such as small craft run at constant rotor assembly speed, some or all of the tabs may be at a fixed angle to the air flow.

Extending downwardly from beneath the cabin housing are struts 38 which have wheels 41 at their lowermost extremes. As illustrated by the dashed lines in FIG. 3, the struts are arranged in a tricycle gear arrangement. In accord with known principles, the wheels may be rotatable and steerable, to enable flexible movement of the craft when it is setting on a flat surface, such as an airport apron or runway. Just above the wheel of each strut is an essentially horizontally disposed airfoil 40. See FIG. 1. As indicated by the arrow near airfoil 40, each airfoil is rotatable about a pivot point on the struts. Thus, during forward flying motion of the craft, the angular orientation of the airfoils can be varied together or separately, to change the attitude of the craft, to roll the craft, and to provide some lift.

A portion of the exhaust gas from the gas turbine engine, or air otherwise moved by it or an alternative prime mover, may also be externally discharged in a tangential direction from the cbain sidewall, and/or vertically downward from the cabin housing at various locations, to augment or substitute for the desired actions of the tabs 34 and the airfoils 40 which has been described.

Figure 8:
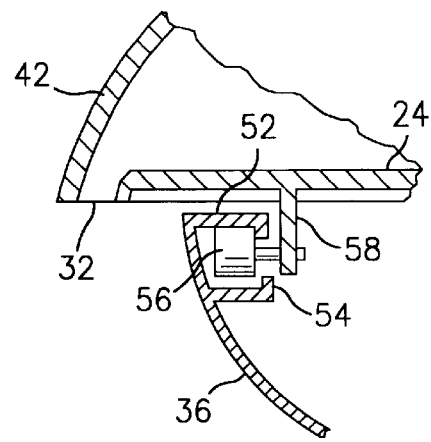
FIG. 8 shows a vertical cross section fragment of the periphery of an aircraft embodying circumferential roller bearings which carry the thrust load between the rotor assembly and cabin.

It is preferred that the rotor assembly be supported only by means of the shaft 28, as described. However, an alternate construction is within contemplation, wherein the shaft may be used principally for rotation only, and the upward thrust of the rotor assembly on the cabin is absorbed by a multiplicity of peripheral roller bearings 56, as shown in FIG. 8. With reference to that fragmentary Figure, a circumferential skirt 58 runs around the underside of the bottom 24 of the rotor assembly. A series of roller bearings are mounted on shafts running radially outward from the skirt. A channel comprised of upper flange 52 and lower flange 54 runs around the interior of the top of the housing 36 of the cabin.

A feature of the invention is that due to the compression of the air within the impeller, the air is heated. The air within heats the top of the rotor assembly, which top is the top of the aircraft, desirably assisting anti-icing effects.

A subscale prototype rotor assembly like that shown in FIG. 1 was constructed of aluminum sheet metal and tested. It had an outside diameter of about 16.5 inch, an inlet hole 30 of 5.5 inch diameter, an impeller peak height of about 3 inches, and a circumferential nozzle 32 with a gap opening of about 0.625 inch. Rotation at about 500 rpm produced about one pound of lift. When three scoops of the fixed 30 degree angle type described above were added, each scoop having an opening of about 3 inch length and ⅜ inch height, the lift was increased to about 1.5 pound. The present concept would desirably be embodied in a larger experimental craft, for instance one having an outside rotor assembly diameter of about 16.5 foot and an inlet opening 30 of about 5.5. foot diameter, and an interior peak height (near the opening) of about 3 foot. It is believed that such a rotor assembly would be capable of providing lift for a craft weighing as much as 2000 pounds. Such a craft may be constructed of lightweight metal alloys and engineered composite materials.

Although this invention has been shown and described with respect to a preferred embodiment, it will be understood by those skilled in this art that various changes in form and detail thereof may be made without departing from the spirit and scope of the claimed invention.

I claim:

1. An aircraft suited for vertical flying motion comprising:

a cabin, containing a prime mover for powering a rotatable rotor assembly, wherein the prime mover imparts a torque to the cabin during flying operation;

a rotatable shaft, extending upwardly from the cabin, driven by the prime mover;

a rotor assembly, mounted above the cabin, connected to the shaft, and adapted to rotate in a desired direction relative to the cabin; comprising a truncated cone shaped top having a central inlet opening; a circular bottom spaced apart from the top; and, rotor vanes, running radially between the top and the bottom of the rotor assembly, from vicinity of the central inlet opening to vicinity of the outer circumferences of said top and bottom;

wherein, the exterior circular edges of the top and the bottom form a downward facing annular nozzle for discharge of air from within the rotor assembly;

the combination of top, bottom and vanes forming an air-moving impeller so that when the top assembly is rotated, air is flowed through the inlet opening of the top, radially outward past the vanes, and then downward through said nozzle; and, means for countering said torque, on the cabin.

2. The aircraft of claim 1 wherein the means for countering said torque comprises a plurality of tabs spaced apart around the periphery of the cabin, lying along the flow path of air discharged from said nozzle.

3. The aircraft of claim 2 further comprising a circumferential ring, running around the cabin, outboard of said tabs.

4. The aircraft of claim 1 further comprising a plurality of air scoops mounted on the surface of the top; each scoop having an opening facing in the desired direction in which the rotor assembly is adapted to rotate; the length of each scoop opening running across the top so that the outermost end thereof is near the periphery of the top and so that the innermost end thereof lies nearer to the central inlet opening of the top; wherein rotation of the rotor assembly causes air to be rammed through the scoop opening and into the interior of the impeller.

5. The aircraft of claim 4 wherein the length of the opening of each scoop runs at an angle to the radius of the top which runs through the innermost end of the scoop length.

6. The aircraft of claim 5 wherein the length of each scoop opening is fixedly oriented at an angle to said radius.

7. The aircraft of claim 6 having three equally spaced apart scoops; each scoop having an opening length oriented at a 30 degree angle to said radius.

8. The aircraft of claim 5 wherein each scoop is rotatably adjustable upon the surface of the top, so the orientation of the length of the opening of each scoop may be varied relative to said radius.

9. The aircraft of claim 1 further comprising struts extending downwardly from the bottom of the cabin; and, airfoils pivotably mounted on the struts, for changing the orientation of the aircraft during forward motion flight.

10. An aircraft suited for vertical flying motion comprising:

a cabin, containing a prime mover for powering a rotatable rotor assembly, wherein the prime mover imparts a torque to the cabin during flying operation;

a rotatable shaft, extending upwardly from the cabin, driven by the prime mover;

a rotor assembly, mounted above the cabin, connected to the shaft, and adapted to rotate in a desired direction relative to the cabin; comprising a truncated cone shaped top having a central inlet opening; a circular bottom spaced apart from the top; and, rotor vanes, running radially between the top and the bottom of the rotor assembly, from vicinity of the central inlet opening to vicinity of the outer circumferences of said top and bottom;

wherein, the exterior circular edges of the top and the bottom form a downward facing annular nozzle for discharge of air from within the rotor assembly;

the combination of rotor assembly top, bottom and vanes forming an air-moving impeller so that when the top assembly is rotated, air is flowed through the inlet opening of the top, radially outward past the vanes, and then downward through said nozzle;

means for countering said torque, comprising a plurality of tabs spaced apart around the periphery of the cabin and lying along the flow path of air discharged from said nozzle; and, a multiplicity of air scoops mounted on the surface of the top, each scoop having an opening facing toward the desired direction in which the rotor assembly is adapted to rotate, so that rotation of the rotor assembly causes air to be rammed into the scoop opening.

11. The aircraft of claim 10 further comprising struts extending downwardly from the bottom of the cabin; and, airfoils pivotably mounted on the struts, for changing the orientation of the aircraft during forward motion flight.

\* \* \* \* \*